United States Patent [19]

Guillemin

[11] Patent Number: 5,023,814

[45] Date of Patent: Jun. 11, 1991

[54] METHOD AND APPARATUS FOR COUNTERTYPING A TINT FROM A COLLECTION OF BASE TINTS

[76] Inventor: Jean-Pierre H. B. Guillemin, 2a, rue Henri Barbusse, 51100 Reims, France

[21] Appl. No.: 392,651

[22] Filed: Aug. 11, 1989

Related U.S. Application Data

[63] Continuation-in-part of Ser. No. 919,262, Sep. 30, 1986, abandoned.

[51] Int. Cl.$^5$ .............................................. G01N 21/25
[52] U.S. Cl. ..................................... 364/526; 364/496; 364/500
[58] Field of Search ............... 364/526; 356/405, 408, 356/409, 410, 496, 500

[56] References Cited

U.S. PATENT DOCUMENTS

| | | | |
|---|---|---|---|
| 3,159,742 | 6/1961 | Davidson | 235/184 |
| 3,476,132 | 11/1969 | Gebel | 137/93 |
| 3,601,589 | 8/1971 | McCarty | 235/150 |
| 3,690,771 | 9/1972 | Armstrong, Jr. et al. | 356/176 |
| 4,278,538 | 7/1981 | Lawrence et al. | 209/580 |
| 4,339,541 | 7/1982 | Ruye | 501/71 |
| 4,613,947 | 9/1986 | Suzuka et al. | 364/526 |
| 4,745,555 | 5/1988 | Connelly et al. | 364/526 |
| 4,813,000 | 3/1989 | Wyman et al. | 364/526 |
| 4,884,221 | 11/1989 | Sugiyama et al. | 364/571.05 |

FOREIGN PATENT DOCUMENTS

2181213 11/1973 France .

OTHER PUBLICATIONS

"Color: A Guide to Basic Facts and Concepts", Chapter 6, Cobrimetry, John Wiley (New York), pp. 123–150.

"Color, Color Measurement and Colorant Formulation in the Textile Industry", Roland E. Derby Jr., from *Journal of the American Association of Textile Chemist and Colorists*, vol. 5, No. 9, Sep. 1973, pp. 188–196.

"Batch Color Correction by Tristimulus Colorimeter", S. Upton Jenkins from *Modern Paints and Coatings*, Sep. 1980, pp. 41 to 44.

*Primary Examiner*—Joseph L. Dixon
*Assistant Examiner*—Ellis B. Ramirez
*Attorney, Agent, or Firm*—Eckert Seamans Cherin & Mellott

[57] ABSTRACT

A method and apparatus to enable countertyping a tint by formulating a theoretical mixture of base tints having known colorimetric parameters. The apparatus employs a filter colorimeter, normally used only to compare differences in tint samples, and iteratively to define additions to enable matching tints by gauging the result of adding base tints. However, the colorimeter according to the invention is defined in its response to known standard tints, and the iterative process is then conducted in the colorimetric domain specific to the particular colorimeter. The response curves of the colorimeter are maintained in data files used to modify calculations made respecting the effects of adding tints, the characteristics of the tints to be added also being stored in the data files. The apparatus can operate an automixer.

12 Claims, 4 Drawing Sheets

FIG. 3
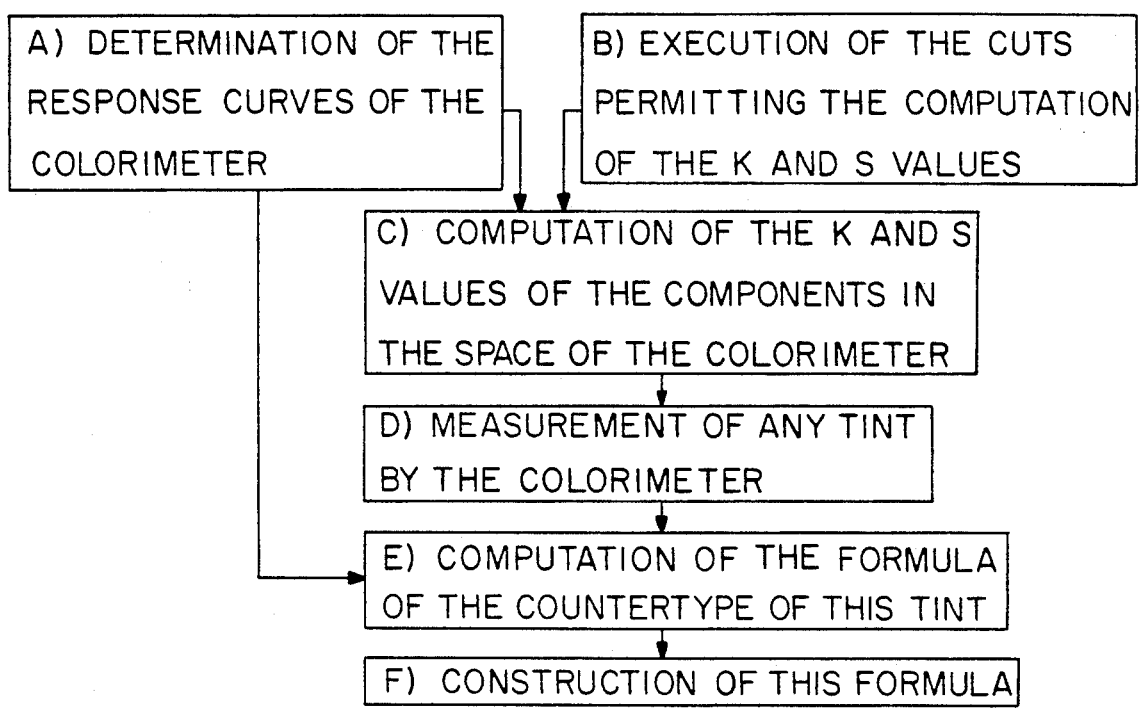
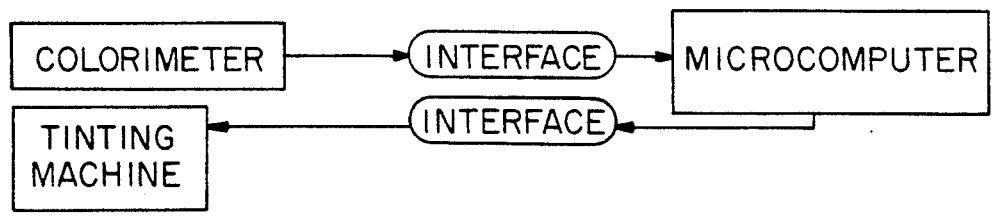
FIG. 4

METHOD AND APPARATUS FOR COUNTERTYPING A TINT FROM A COLLECTION OF BASE TINTS

Cross Reference to Related Application

This is a continuation-in-part of application Ser. No. 919,262, filed Sept. 30, 1986, now to be abandoned.

BACKGROUND OF THE INVENTION

1. Field of the Invention

The present invention concerns a method and apparatus for countertyping a tint by formulating a composition made from a collection of basic tints, without measuring the reflectance curve of the tint to be countertyped. In particular, the invention is a method and apparatus permitting an absolute formulation of tint parameters, rather than a relative formulation, thereby enabling tint formulation using a tristimulus colorimeter and not requiring a spectraphotometer as previously needed for absolute tint formulation.

2. Prior Art

Numerous industries are obliged to paint their production with paints specifically adapted to the types of their manufactures in tints sometimes very numerous. There are two results:

(1) mass produced paints available in quantity from large manufacturers are not suitable; and, (2) the amounts per tint (often less than 100 kg) are not profitable and result, besides a high cost, in difficulties of supply not only from the quality standpoint but also from the delivery standpoint. Few paint manufacturers are structured for responding to this demand which nevertheless is increasing considerably.

The known manner of dealing with this problem at the level of the paint manufacturers requires a relatively high investment and qualified staff.

In fact, up to now, a spectrophotometer has been used for custom tint formulation which determines the reflectance spectrum, or spectral reemission curve, of the sample to be countertyped, i.e. the relationship between R, the reflectance coefficient, and the absorption K and diffusion S coefficients of the tint of the sample, over the whole visible spectrum (400–700 nm) taken at regular wave length intervals, in accordance with the Kubelka-Munk law $$\frac{K}{S} = \frac{(1-R)^2}{2R} \quad (1)$$

for each given wave length $\lambda$.

Knowing the reflectance spectrum of the basic tints and applying the relationship:

$$\frac{K}{S} \cdot M(\lambda) = \frac{KA(\lambda) \times CA}{SA(\lambda) \times CA} + \frac{KB(\lambda) \times CB}{SB(\lambda) \times CB} + \cdots + \frac{KW(\lambda) \times CW}{SW(\lambda) \times CW}$$

where the meaning of the symbols used is as follows:
M = mixture of the basic tints,
A = first basic tint,
B = second basic tint,
W = basic white,
C = concentration of the basic tint concerned, the formulation of the tint recipes may be calculated in this manner. This calculation is obviously very complex and requires the use of a computer.

The known manner of countertyping basically relied on relative comparison of a needed tint with a proposed sample, to obtain information regarding additions of further tints to cause the proposed sample to more closely approximate the needed tint.

The state of the art, at least as of February 1985 thus permitted corrections of existing formulae to be obtained (i.e., relative formulation of tint parameters) from the differences measured by a filter colorimeter, also known as a "tristimulus colorimeter", between the values measured on the standard to be countertyped (the needed tint) and the values measured on the tint obtained from a formula (the proposed tint), the parameters of which are known and preferably are, at the outset, close to the tint of the standard.

This type of process is described, for example, in U.S. Pat. No. 3,690,771-Armstrong et.al.; in U.S. Pat. No. 3,601,589-McCarthy; and in the publication "Batch Color Correction by Tristimulus Colorimeter" of *Modern Paints and Coatings*, September 1980, pages 41 to 44. This process is shown in FIG. 2, a block diagram, and can be explained as follows with reference to Steps A through D:

Step A - Computation of the K and S Values

The absorption coefficient K and diffusion coefficient S are computed by the person skilled in the art, based on the KUBELKA and MUNK relations (1931) (i.e., equations (15) and (17) cited in U.S. Pat. No. 3,601,589) and the SAUNDERSON equation (1954) expressing the modification of the reflectance curve at the position of the air/object interface:

$$R' = \frac{(1-K_e)(1-K_i)R}{1-K_i R} + K_i$$

where
R' is the measured reflectance;
R is the internal reflectance within the object;
$K_e$ is the external correction coefficient, subject to the FRESNEL law;

$$K_e = \frac{(1-n)^2}{(1+n)^2}; \text{ and,}$$

$K_i$ is the internal correction coefficient (a value close to 0.65).

In U.S. Pat. No. 3,601,589 an approximate expression is used for defining $K_e$, namely as identified by equation (14) in said patent

Step B - Preparation of a Known Formula

A known formula is produced, which is preferably close to the tint to be countertyped and the qualitative and quantitative composition of the known formula is accurately known.

Step C - Measurement of the Color Differences

A filter colorimeter or a spectrophotometer is used to measure the differences between the tint characterized by the known formula and the target tint to be countertyped in a known trichromatic system (in general, a CIE system).

Step D - Computation of the Corrections

These computations, which are carried out on a computer, are based on an identical principle. An expression is sought, which permits the computation of a difference of concentration as a function of the difference of measured values of the THREE chromatic components.

This expression is of the form:

$$\Delta C = f(\Delta T),$$

in which $\Delta C$ = difference of concentration $\Delta T$ = difference of a trichromatic component In order to model this relation, use is made of an expression which is most generally non-linear, based on derivatives of the KUBELKA and MUNK equations and the SAUNDERSON equation and the expressions for the measured trichromatic values.

As the value of $\Delta C$ obtained in inferred from a derivative, the results will be the more accurate as the differences of the measured trichromatic values become smaller. This implies a number of iterations of the correction scheme, i.e., repetitively proceeding through Steps B and C as shown in FIG. 2, until the accuracy of the result is deemed acceptable for the use contemplated. With greater iterations, the tint obtained comes closer and closer to the tint to be countertyped. The relations used between $\Delta C$ and $\Delta T$ are numerous and are dependent upon the trichromatic system of measurement. Reference can be made to equations (34) to (46) of U.S. Pat. No. 3,601,589, and the expressions cited in columns 6 and 8 of U.S. Pat. No. 3,690,771 for further particulars in this regard. The disclosure of said patents and the aforesaid publication, "BATCH COLOR CORRECTION BY TRISTIMULUS COLORIMETER" are hereby incorporated herein by reference.

It thus appears that prior to the invention the state of the art was represented by:

the spectrophotometric method permitting an absolute formulation; or the colorimetric method permitting only a differential formulation.

Whereas, the present invention actually permits the use of a colorimetric method to achieve an absolute formulation.

One may attempt to implement iterative processes using a filter colorimeter, however, an iterative process can be used effectively with a filter colorimeter only subject to the imperative condition of being able to measure the tint to be countertyped and the countertype obtained, both using the same colorimeter. Inasmuch as a filter colorimeter measures only differences, it can be used only for processes using differences as the basis of computation. This of course bars use of a filter colorimeter in any applications based on absolute values, including the applications involving the absolute values of a standard tint to be countertyped, which has not been measured by the colorimeter with which the measurements are taken in the foregoing iterative process. All these constraints greatly restrict the field of application of filter colorimeters with regard to the formulation of tints by correction, and excludes the possibility of defining and relying upon an absolute formulation which would enable standardization of tint formulation using absolute rather than relative tint component definitions.

A filter colorimeter per se cannot give absolute values referenced CIE in a precise manner, for a number of reasons as follows, particularly because inevitable variations occur in the manufacture of filter colorimeters and their component parts.

The filters can be manufactured only in approximate reproduction of the curves $\overline{X}, \overline{Y}, \overline{Z}$ normalized by the CIE, either for the 2° observer or for the 10° observer (2° and 10° are the nominal angles at which the theoretical observer examines the tint, according to two CIE systems, and in any event the same necessity for approximations would accrue at other similar incidence angles). The illuminant can be reproduced only approximately in accordance with the curves defined by the CIE, inevitable variations in the illuminant also occurring.

Accordingly, the reproducibility of results obtained on one colorimeter as opposed to another is dependent upon at least the following parameters, even if the colorimeters are ostensibly identical models from the same manufacturer:

reproducibility of the filters;

reproducibility of the illuminant;

reproducibility of the photo-receiving cells;

background noise of the particular electronic system and its environment;

the structure and alignment of the optical geometry of the apparatus for collection of the reflected energy; and, the nature and optical geometry of the apparatus for emission of luminous energy.

Moreover, the parameters of the known filter colorimeter do not need to be perfectly reproducible from one apparatus to the other, since these apparatus are designed and intended to measure differences and not to measure absolute values. Accordingly, the designers apply their quality control efforts to obtaining good reproducibility of the values of differences measured between two samples by two different filter colorimeter apparatus and not to the reproducibility of any absolute values.

The advantages of designing to measure differences include a manufacturing cost of the apparatus which is very much less than that of spectrophotometers, as well as a robustness and a simplicity of use which is very greatly superior to spectrophotometers. On the other hand, the absolute values given by two different apparatus cannot correspond perfectly throughout the trichromatic space.

In connection with this disclosure, it is useful to refer to definitions of certain terms to which reference is made herein.

According to the principle of reduced visual trivariance, a real radiation of any color whatsoever (i.e., a radiation which emanates from real sources) can be visually reproduced on an identical basis under specified conditions of observation. This is accomplished by the algebraic mixing, in defined proportions and in unique manner, of luminous fluxes of three real colored radiations. The three real colored radiations may be arbitrarily selected, provided that none of them can be reproduced by an appropriate mixture of the other two. The foregoing principle can also be generalized according to the principle of generalized visual trivariance, which extends the foregoing concept to the case of any sources, real or not, from which radiation can emanate or which can be modeled to represent radiation. Any system of specification and/or representation of colors which is based on the principle of visual trivariance is termed a trichromatic system. In dealing with specifications and/or representations of colors, one refers to the trichromatic spectral components, namely a set o three functions of the wave length λ, which in a given trichromatic system define the monochromatic elements of a spectrum of equal energy. Similarly, the trichromatic components represent the quantity of each one of the three reference (or primary)stimuli of the trichromatic system permitting the reconstitution of the equivalent of a stimulus of given color. In this connection, color stimulus is the physical phenomenon of spectral radiation which penetrates the viewer's eye and produces the sensation of color. A colorimeter is an apparatus that permits the determination of the trichromatic coordinates or trichromatic components of a color stimulus (real or hypothetically construed) under strictly defined conditions of illumination and of observation.

Visual trivariance is established by three colored radiations (for example, green, blue and red), of which any two cannot reproduce the third. While one might define colors using visual trivariance, a colorimeter constitutes a particular trichromatic system defined by its trichromatic spectral components. These trichromatic spectral components are specific to each colorimeter, giving rise to a difference trichromatic system for each colorimeter. The response curves to which reference is made herein correspond to the trichromatic spectral components.

According to the invention, use is made of the spectral distribution curves of three knows colors (e.g., green, blue and red) measured by means of a spectrophotometer which provides absolute values. The parameters $a_n$, $b_n$ and $c_n$ (where "n" is one of the three colors) are obtained from absolute values measured by the spectrophotometer. When these three components are measured by the colorimeter, and provided the differences between the values calculated on the basis of the spectrophotometer readings and the values measured on the basis of the colorimeter approach zero, it becomes possible to calculate the absolute values, and to treat mathematically color values, based on the absolute colors. This allows the user to take advantage of standardized color definitions for measurement and hypothetical color constructions, without any necessity to undertake on each occasion a differential measurement between a sample color and a shade of known composition.

SUMMARY OF THE INVENTION

It is an object of the invention to make possible the use of a filter (tristimulus) colorimeter in all the fields in which absolute values of tint characterizations are useful, in particular, in absolute formulations of tints.

Accordingly, this process permits the use of the filter tristimulus colorimeter in applications which were hitherto reserved for spectrophotometers, these being applications such as the absolute formulation of tints, while benefiting from the numerous advantages which are exhibited by colorimeters in comparison with spectrophotometers: low cost, robustness, ease of use, etc.

The invention includes the concept of defining the "personal" equation of the particular colorimeter relative to an absolute standard, which personal equation can be expressed in the specific response curves of each apparatus to be employed in tint formulation and/or definition in an absolute sense.

The process of the invention demands that the colorimeter should not exhibit, with the passage of time, a drift in the absolute values measured subject to the "personal" equation on a sample which is deemed to be stable. This may be obtained by use of apparatus designed on the principle of a measurement carried out on the ratio of the energy emitted to the energy received.

Briefly stated, the invention proposes to undertake an absolute formulation of tint, that is to say to compute, as a function of the known characteristics of a collection of basic tints, the formula which must be implemented in practice in order to obtain the desired tint. Prior to the invention, only a spectrophotometer permitted the performance of such an absolute formulation by having recourse to the measurement of the curve of reflectance of the tint to be countertyped. The processes using not a spectrophotometer but a filter colorimeter, also referred to as a tristimulus colorimeter, do not perform an absolute formulation, but a differential formulation.

BRIEF DESCRIPTION OF THE DRAWINGS

There are shown in the drawings embodiments of a preferred method and apparatus according to the invention. The invention is subject to certain variations and groupings of components in accordance with the description which follows. Accordingly, the drawings are intended as exemplary rather than limiting. In the drawings.

FIG. 3 is a flow diagram showing the steps of the process according to the invention;

FIG. 4 is a block diagram showing the apparatus according to the invention; and, FIG. 5 is a block diagram of an alternative embodiment.

DETAILED DESCRIPTION OF THE PREFERRED EMBODIMENTS

Figure 1:
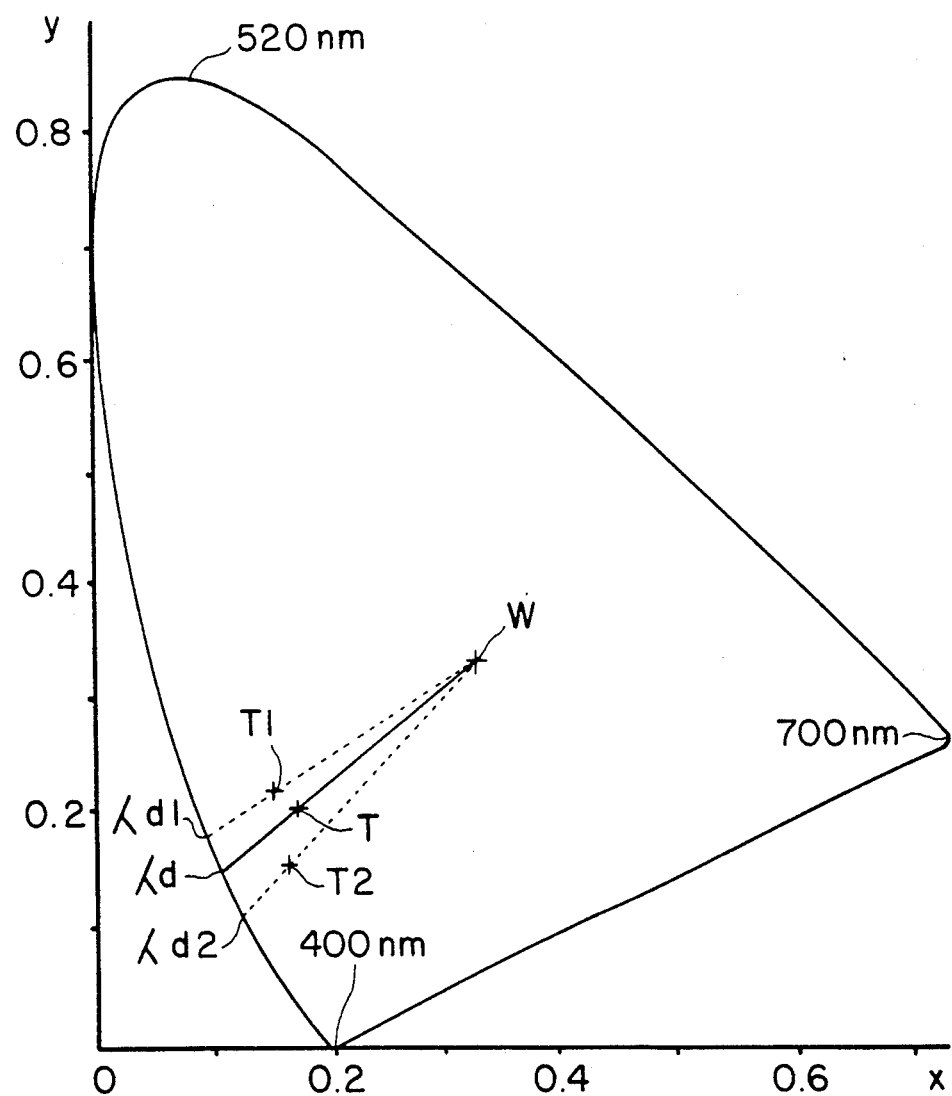
FIG. 1 is a graph illustrating the colorimetric field, with reference to certain variables discussed herein.
Figure 2:
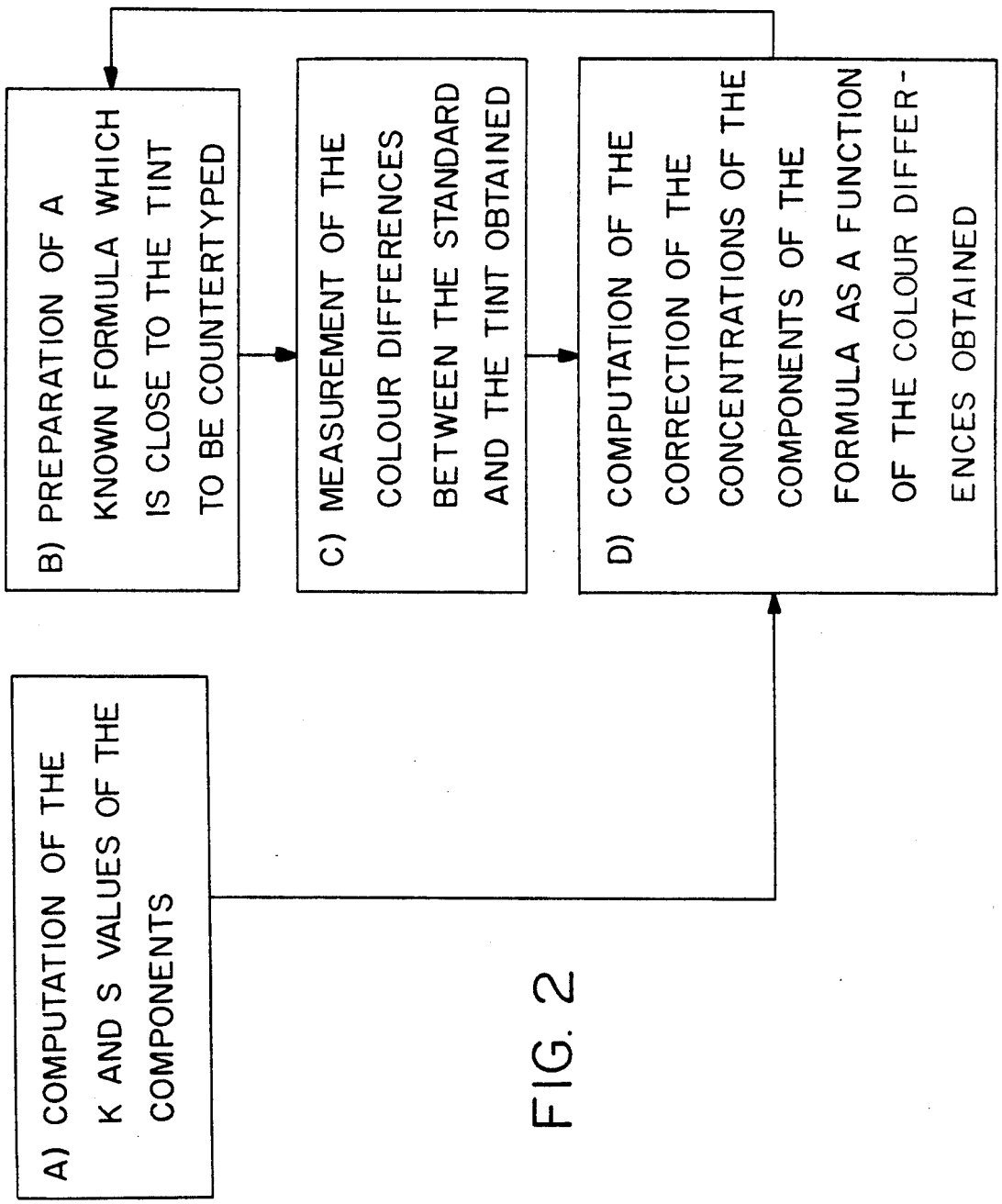
FIG. 2 is a flow diagram showing the steps of an iterative procedure for arriving at a tint formulation.

According to the invention it is necessary to compute and define the trichromatic space of the colorimeter, and thereafter to operate in the trichromatic space of the colorimeter. This enables one to relate the trichromatic space of the colorimeter to the CIE defined space (International Commission on Illumination or Commissione Internationale de L'Eclairage).

Let us first assume that the response curves of the colorimeter as a function of wavelength are known as:
$\overline{X}r_{(\lambda)} = \overline{X}c_{(\lambda)} \cdot \overline{X}c_{(\lambda)} \cdot x_{(\lambda)}$, equivalent to $\overline{S}_\omega \cdot \overline{S}_{(\lambda)}$ of C I E;
$\overline{Y}r_{(\lambda)} = \overline{Y}c_{(\lambda)} \cdot \overline{S}c_{(\lambda)} \cdot y_{(\lambda)}$, equivalent to $\overline{Y}_{(\lambda)} \cdot \overline{S}_{(\lambda)}$ of C I E;
$\overline{Z}r_{(\lambda)} = \overline{Z}c_{(\lambda)} \cdot \overline{S}c_{(\lambda)} \cdot z_{(\lambda)}$, equivalent to $\overline{Z}_{(\lambda)} \cdot \overline{S}_{(\lambda)}$ of C I E;
where $\overline{X}_{(\lambda)}$, $\overline{Y}_{(\lambda)}$, $\overline{Z}_{(\lambda)}$ are the curves of the spectral components defined by the CIE and $\overline{S}_{(\lambda)}$ is the curve of energy distribution of the CIE standardized illuminant.

$\overline{X}c_{(\lambda)}$, $\overline{Y}c_{(\lambda)}$ and $\overline{Z}c_{(\lambda)}$ are the curves of the filters of the colorimeters;

$\overline{S}c_{(\lambda)}$ is the curve of the illuminant of the colorimeter;

$x_{(\lambda)}$, $y_{(\lambda)}$, $z_{(\lambda)}$ are the correction coefficients at each wavelength integrating the responses due to the particular sensitivity of the photo-receiving cells, the background noise and the optical geometry.

Knowing a curve of reflectance $\overline{R}_{(\lambda)}$ of any tint, it is possible to compute the values X, Y, Z which the colorimeter will measure on this tint by the CIE expressions:
$X = K \cdot \Sigma \overline{X}r_{(\lambda)} d\lambda$
with $K = 100/\Sigma \overline{Y}r_{(\lambda)} d\lambda$
$Y = K \cdot \Sigma \overline{Y}r_{(\lambda)} d\lambda$
$Z = K \cdot \Sigma \overline{Z}r_{(\lambda)} d\lambda$ This assumes that the curves $\overline{Z}r_{(\lambda)}$, $\overline{Y}r_{(\lambda)}$, $\overline{Z}r_{(\lambda)}$ are known, and once defined, the response curves enable all the computations to be carried out in the trichromatic space of the colorimeter determined by the response curves of the colorimeter.

The obligation according to the invention to operate within the trichromatic space of the colorimeter originates from the fact that it is always possible to compute tristimulus values in this space, subject to the condition of knowing the response curves and the corresponding reflectance curve. On the other hand, it is not possible to transfer directly the measured values from the space of the colorimeter to the CIE space without knowledge of the spectral curve. In the course of the computations of a formulation according to the invention, therefore it is possible to know permanently the spectral distribution curve of a tint mixture of known composition, of which the K and S values of each of the respective components are known, while it is not possible to compute the spectral distribution curve of a tint just on the basis of its tristimulus values, even if the response curves of the colorimeter are known with precision. This is very important, since the principle of the invention can be applied only in the trichromatic space of the colorimeter as defined by the response curves.

It is therefore necessary to compute the response curves, which is done as follows:

$$\text{Let } \phi_{(\lambda)} = \overline{R}_{(\lambda)} \overline{S}_{(\lambda)} = a\, \overline{X}_{(\lambda)} + b\, \overline{Y}_{(80)} + c\, \overline{Z}_{(\lambda)} \quad (1)$$

It is knows (from CIE) that X, Y and Z are defined as $$X = K \cdot \Sigma\, X_{(\lambda)} \cdot \phi_{(\lambda)} \cdot d\lambda$$
$$Y = K \cdot \Sigma\, Y_{(\lambda)} \cdot \phi_{(\lambda)} \cdot d\lambda \quad \text{-2-}$$
$$Z = K \cdot \Sigma\, Z_{(\lambda)} \cdot \phi_{(\lambda)} \cdot d\lambda$$

with $K = 100/\Sigma Y_{(\lambda)} d\lambda$

Equations -1- and -2- are combined, with $\propto_{(\lambda)} \cdot d\lambda$, to obtain equation -3-:

$$X = K \cdot (a\Sigma \overline{Z}_{(\lambda)} \overline{X}_{(\lambda)} \propto_{(\lambda)} + B\Sigma \overline{X}_{(\lambda)} \overline{Y}_{(\lambda)} \propto_{(\lambda)} + C\Sigma \overline{X}_{(\lambda)} \overline{Z}_{(\lambda)} \propto_{(\lambda)})$$

$$Y = K \cdot (a\Sigma \overline{Y}_{(\lambda)} \overline{Z}_{(\lambda)} \propto_{(\lambda)} + b\Sigma \overline{Y}_{(\lambda)} \overline{Y}_{(\lambda)} \propto_{(\lambda)} + c\Sigma \overline{Y}_{(\lambda)} \overline{Z}_{(\lambda)} \propto_{(\lambda)}) \quad \text{-3-}$$

$$Z = K \cdot (a\, \Sigma \overline{Z}_{(\lambda)} \overline{X}_{(\lambda)} \propto_{(\lambda)} + b\Sigma \overline{Z}_{(\lambda)} \overline{Y}_{(\lambda)} \propto_{(\lambda)} + c\Sigma \overline{Z}_{(\lambda)} \overline{Z}_{(\lambda)} \propto_{(\lambda)})$$

a, b and c are then extracted from this system, these being specific $\phi_{(\lambda)}$. a, b and c are coefficients which are specific to the present invention, and can be defined as metamerism coefficients as explained in detail hereinafter.

Next, let there be 3 tints $\phi_1$, $\phi_2$, $\phi_3$, the spectral distribution curves of which are not proportional (the BLUE, the GREEN and the YELLOW have been selected for this example).

With the preceding system, the following coefficients are extracted $a_1, a_2, a_3,$ $b_1, b_2, b_3,$ $c_1, c_2, c_3$ and the following system is set up for each wavelength:

$$\phi_1 = a_1 \overline{X}r + b_1 \overline{Y}r + c_1 \overline{Z}r$$
$$\phi_2 = a_2 \overline{X}r + b_2 \overline{Y}r + c_2 \overline{Z}r \quad \text{-4-}$$
$$\phi_3 = a_3 \overline{X}r + b_3 \overline{Y}r + c_3 \overline{Z}r$$

The values of the response curves $\overline{Z}r$, $\overline{Y}r$, $\overline{Z}r$ are inferred from this, for each wavelength, producing defined response curves.

At the practical level, the response curves obtained involve a certain imprecision, since they are dependent, on the one hand, upon the dispersibility of the results of the colorimeter and, on the other hand, upon the dispersibility of the results of the spectrophotometer which served to establish the curves $\phi_1$, $\phi_2$, $\phi_3$.

This imprecision leads to a mean $\Delta E$ of precision of computation of the tristimulus values recomputed with the aid of these response curves for a curve $\phi$ measured using the spectrophotometer in relation to the real values measured using the colorimeter. It has been possible for this $\Delta E$, in the course of the experimental investigation, and then by application of the process, to reach values within the ranged between 0.4 and 1.2 dependent, above all, upon the equipment employed.

This precision is less than adequate for an acceptable countertyping in absolute formulation, compared with the customary precision obtained by systems for formulation on a spectrophotometer.

However, it has been possible to obtain a precision which is identical, or even greater than that of the systems on the highest-performance spectrophotometer available on the market, by proceeding according to the invention with the following corrections, undertaken when computing the K (absorption) and S (diffusion) values in the trichromatic space of the colorimeter.

Knowing $\overline{Z}$, $\overline{Y}$, $\overline{Z}$, $\phi$, K, X, Y and Z, it is possible to use equation -3- above to compute the coefficients a, b and c and thus to compute the curve $\phi$, by using equation -1-.

This would mean that, knowing the tristimulus values of a tint, it would be possible to recompute its reflectance curve. However, in the first analysis this appears to be mathematically impossible.

In fact, it is possible to compute a reflectance curve which mathematically constitutes a response to the initial tristimulus values X, Y and Z, but this curve is only one mathematical response among all the infinitely possible responses of the metameric tints satisfying the initial values X, Y, Z and the curve thus computed even includes negative portions, which truly is physically impossible.

However, it is possible to compute a curve satisfying the physical plane, subject to the condition of having knowledge of a curve corresponding to values X, Y, Z which are close to the initial values, by using equations -1- and -3- above, modified according to the invention in the following manner:

$$\phi_{1(\lambda)} = \phi_{2(\lambda)} + a\, \overline{X}_{(\lambda)} + b\, \overline{Y}_{(\lambda)} + c\, \overline{Z}_{\lambda} \quad \text{-5-}$$

where $\phi_1$ is the desired curve of tristimulus values $X_1$, $Y_1$, $Z_1$ and $\phi_2$ is the known curve of values $X_2$, $Y_2$ if $X_1 = X_2 = 0$ and $Y_1 - Y_2 = 0$ $Z_1 - Z_2 = 0$ It is possible to write with $\phi_{(\lambda)} = \overline{S}_{(\lambda)} d\lambda$ $X_1 - X_2 = K$
$(a\Sigma \overline{X}_{(\lambda)} \overline{X}_{(\lambda)} \propto_{(\lambda)} + b\Sigma \overline{X}_{(\lambda)} \overline{Y}_{(\lambda)} \propto_{(\lambda)} + c\Sigma \overline{X}_{(\lambda)} \overline{Z}_{(\lambda)} \cdot \propto_{(\lambda)})$ $Y_1 - Y_2 = K$
$(a\Sigma \overline{Y}_{(\lambda)} \overline{X}_{(\lambda)} \propto_{(\lambda)} + b\Sigma \overline{Y}_{(\lambda)} \overline{Y}_{(\lambda)} \propto_{(\lambda)} + c\Sigma \overline{Y}_{(\lambda)} \overline{Z}_{(\lambda)} \cdot \propto_{(\lambda)})$ -6-

$Z_1 - A_2 = K$
$(a\Sigma \overline{Z}_{(\lambda)} \overline{X}_{(\lambda)} \propto_{(\lambda)} + b\Sigma \overline{Z}_{(\lambda)} \overline{Y}_{(\lambda)} \propto_{(\lambda)} + c\Sigma \overline{Z}_{(\lambda)} \overline{Z}_{(\lambda)} \propto_{(\lambda)})$ From this it is possible to extract a, b and c, which are applied to the relation -5-. The curve $\phi_1$ is thereby computed, this curve being physically acceptable and metameric with the desired curve.

The foregoing method permits the determination of the K and S values of the components in the chromatic space of the colorimeter.

The conventional methods of computation of the K and S values are thereafter implemented on the basis of the reflectance curves of known mixtures of these components. Thus, the reflectance curves of these mixtures are measured by means of the spectrophotometer which has served to compute the response curves of the colorimeter with respect to the applications of these mixtures. By computation on these reflectance curves $\phi_2$, the values of $X_2$, $Y_2$, $Z_2$ are obtained from the response curves of the colorimeter.

With respect to the applications of these mixtures, the values $X_1$, $Y_1$, $Z_1$ are measured with the colorimeter, these values being very close to $X_2$, $Y_2$, $Z_2$ since they are within a mean $\Delta E$ of the order of the precision of the computation of the response curves. It is thus possible to compute $\phi_1$ with the aid of the equations -5- and -6-. It is with the curves $\phi_1$ thus computed that the K and S values are established.

In this way, all the curves computed from the K and S values thus determined for mixtures of determined composition will permit the computation, together with the response curves of the colorimeter, of the precise tristimulus values within the trichromatic space specific to the particular colorimeter. This is an absolute formulation, which accordingly operates in a manner similar to operation of the much more sophisticated and expensive spectrophotometer and in fact provides results which are identical, if not superior, to those of a spectrophotometer (which of course has its own needs as to precision, calibration and the like) as has been verified by the use of this system on the premises of manufacturers of paints.

One can compare the process according to the invention with the known iterative process described above in the "prior art" section of the specification with respect to the scheme of the process of the invention as shown in FIG. 3.

As shown in FIG. 3, a first step is the aforesaid determination of the response curves of the colorimeter. This is accomplished as set forth above with respect to equations -1-, -2- and -3-. Colorimeter-specific coefficients a, b and c, namely the metamerism coefficients are determined and the tint definitions according to equation -4- are determined with respect to each wavelength. The response curves will be employed in the computation of the K and S values, and in the computation of the formula of the countertype for the particular tint. A reflectance curve is thereafter calculated, with respect to values X, Y and Z, close to the initial values via equations -1- and -3- above, modified by equation -5-. This is indicated in FIG. 3 by step B, namely execution of the cuts permitting the computation of the K and S values. As in step C, the K and S are computed in the space of the colorimeter, thereby encoding absolutely the particular characterization of the colorimeter and its components. Next, as in step D, the colorimeter is used to measure any tint and the formula of the countertype for this tint (step E) and construction of the formula (step F) follow directly.

The great advantage of the described process resides in the fact that it is capable of computing a tint formula without a close starting formula, leading to the capability of absolute tint formulation as compared to the relative formulation (by differential correction) which can be performed by known processes.

This process permits one to enjoy the same possibilities and aspects of performance as with spectrophotometers, thereby improving on known processes using colorimeters as tools for the iterative correction of a pre-established formula. Moreover, the invention, unlike a sophisticated spectrophotometer, can be placed at the disposal of novices for the countertyping of tints. Furthermore, as a result of its automated nature, the process according to the invention permits the countertyping of all tints on the distribution site by personnel who do not specialize in colorimetry—which is strictly impossible even with the known processes of iterative correction using a colorimeter.

The equipment proposed at the present time on the world market, for implementing this method, is formed of a spectrophotocolorimeter coupled to a computer generally of 16 bits. These two types of equipment related to a complex software involve a minimum expense of some 500 000 FF (1985) for acquiring them. This price limits their use to a few users whose turn-over allows the economic amortizement of such a purchase.

Furthermore, this equipment is designed for research and it requires a qualified staff capable of using the information supplied. In fact, for a tint to be countertyped, ten formulations or so are proposed. Only a specialist can choose the formula the best adapted to the problem raised.

The purpose of the present invention is to provide a method and apparatus for countertyping a tint under much more economic conditions and not requiring a qualified staff.

This aim is reached in that the method eliminates the need to determine the reflectance spectrum of the sample to be countertyped, for which it substitutes the determination of the trichromatic coordinates x, y and the trichromatic component Y of the tint of said sample.

This approach to the problem is quite contrary to existing preconceived ideas the proof of which can be found, particularly in the brochure "Mesure de la couleur et reperage" by Claude NEVEU, published by the Centre Francais de la Couleur, where it is stated on page 22, "in colorimeters: impossibility of tint formulation".

It follows then that it becomes possible to use, for an industrially acceptable formula research time, instead of a spectrophotometer, a tristimulus control colorimeter and instead of a 16 bit computer, an 8 bit processor. Since the software used is relatively simple, the cost price of the whole may be up to five times less than that of the equipment at present available.

More precisely, the method of the invention comprises the steps of:

forming a first file, formed, on the one hand, of the values of the spectral trichromatic components defined by the response curves of the colorimeter, namely $\overline{Z}r_{(\lambda)}$, $\overline{Y}r_{(\lambda)}$ and $\overline{Z}r_{(\lambda)}$ (whereby calculations are carried out in the trichromatic space defined by the response curves of the colorimeter), and, on the other hand, the values of the curve of the illuminant under which the colorimeter works which will be used for measuring the sample to be countertyped;

forming a second file formed of the values K (absorption) and S (diffusion) of the basic tints;

calculating, from said two files, the values of three characteristics, functions of the trichromatic components X, Y and Z, for each basic tint;

measuring, by colorimetry, the trichromatic components X, Y, Z of the sample to be countertyped, from which the trichromatic coordinates x, y of the tint of this sample are obtained;

determining, from the first file and from the values obtained by the colorimetric measurement the same three characteristic values for the tint to be countertyped; and, by successive approximations, determining a mixture of at least four basic tints, including white and black, which have the same three characteristic values equal to those of the tint to be countertyped, within tolerances as dictated by the need for accuracy in the particular field of use.

The values K and S of the basic tints are calculated from spectral reemission curves of the black and white range of the basic tints, the concentration of these ranges being determined depending on the nature of the basic tints so as to obtain the greatest accuracy in calculating the K and S coefficients. These spectral reemission curves are obtained by spectrophotometry, preferably by the paint manufacturer or by the supplier of the apparatus required for implementing the invention as documentation defining the characteristics of the tints.

If the successive batches of basic tints are supplied by the manufacturer with a defect in the constancy of the values K (absorption) and S (diffusion), the user only has to make a colorimetric measurement of the trichromatic values on the white and black ranges of these tints for calculating a correction coefficient.

In a preferred embodiment of the invention, the first file of the values of the spectral trichromatic components covers the visible spectrum, preferably, by steps of 1 nm, i.e., 301 values for $\overline{x}$ ($\lambda$), 301 values for $\overline{Y}$ ($\lambda$), 301 values for $\overline{z}$ ($\lambda$). Storage of this file results in storing the spectral locus which is the curve of the wave lengths, corresponding to each combination of trichromatic coordinates x, y (since $x+y+z=1$, it is sufficient to use x and y, the neutral point W being given by $x=\frac{1}{3}$, $y=\frac{1}{3}$ under a hypothetical equienergy illuminant).

The second file covers the visible spectrum in steps of 20 nm, namely 16 values of K and 16 values of S for each basic tint.

In practice, the three characteristics of the basic tints and of the tint to be countertyped, functions of X, Y and Z, are the dominant wave length $\lambda d_1$, $\lambda d_2$, ... $\lambda d_n$, the luminance $Y_1$, $Y_2$, ... $Y_n$ and the purity $Pu_1$, $Pu_2$, ... $Pu_n$.

Determination of the final mixture by successive approximations is achieved by successive approximations in this order: the dominant wave length, the luminance and the purity.

The approximation of the dominant wave length is obtained by selecting at least two basic tints whose dominant wave lengths $\lambda d_1$ and $\lambda d_2$ enclose the dominant wave lengths $\lambda d$ of the tint to be countertyped and by determining a mixture ratio between these tints until a mixture is obtained whose dominant wave length $\lambda d_m$ is satisfactory.

Then we pass to the approximation of the luminance. This approximation is obtained by adding white or black to the mixture from the preceding step, depending on whether its luminance is lower or higher than that of the tint to be countertyped, until a satisfactory luminance $Y_m$ is obtained.

Then we pass to the approximation of the purity which is achieved in two steps, namely:

determination of a grey with luminance equal to that of the tint to be countertyped, then addition of this grey to the mixture from the preceding step until satisfactory purity $Pu_m$ is obtained.

Between each approximation, the spectral reemission curve of the mixture obtained and the value of the characteristic function of X, Y, Z object of the approximation, are calculated, after which the value obtained is compared with the desired value so as to determine if the difference falls within the initially fixed limits of tolerance.

In the negative, the approximation is repeated by a new approximation; in the affirmative, we pass to the approximation of the following characteristic.

It will be noted that X, Y and Z are calculated as follows:

$$X = \Sigma R (\lambda) E (\lambda) \overline{x} (\lambda) d (\lambda)$$

$$Y = \Sigma R (\lambda) E (\lambda) \overline{y} (\lambda) d (\lambda)$$

$$Z = \Sigma R (\lambda) E (\lambda) \overline{z} (\lambda) d$$

where R designates the reflectance, E the luminance, $x(\lambda)$, $\overline{y}(\lambda)$, and $\overline{z}(\lambda)$, the spectral trichromatic components and $\underline{d}$ the chosen difference between two wave lengths.

When the first approximation of the three characteristics $\lambda d$, Y and Pu is finished, the spectral reemission curve of the mixture obtained and the value of the three characteristics objects of the approximation are calculated, after which it is determined whether the $\Delta E$ such as defined by C.I.E., namely:

$$E = (\Delta L^{*2} + a^{*2}\Delta b^{*2})^{\frac{1}{2}}$$

where L*, a* and b* ar functions of X, Y and Z comes within the initially fixed limits of tolerance.

It will in fact be understood that each new tint addition introduces a drift in the previously approximated characteristic or characteristics, in particularly because of the Aubert effect, and that this drift may be such that it makes the mixture obtained unacceptable.

If $\Delta E$ is greater than the fixed tolerance, a second approximation is undertaken and so on until the $\Delta E$ of the resultant mixture is within the fixed tolerance.

Preferably, the admissible deviation fixed at the outset for each characteristic is relatively wide and is automatically reduced for each reiteration of the three approximations.

It will be further noted that, from the first selection of the tints to be mixed, it is checked whether the purity of the mixture of these tints is greater than the purity of the tint to be countertyped. If such is not the case, it is pointless going further: a mixture will never be obtained satisfying the desired conditions.

When a mixture is obtained whose dominant wave length, luminance and purity are acceptable, the procedure is finished: in the simplest version there is obtained, on a screen or a printer, a single composition of a tinted paint from the collection of basic tints, and the user need only mix the basic tints in the proportions indicated in the composition.

Of course, this mixture is the first mixture really effected: all the previous mixing operations are purely fictitious.

The mixture obtained, although satisfactory from a theoretical point of view, may in practice have an unacceptable $\Delta E$ because for example of flocculation problems between pigments, because of the mode of application, etc . . . To remedy this situation, a colorimetric measurement is made of the tint effectively obtained and its characteristics are compared with those of the tint to be countertyped, after which a correction is made by adding the desired amount of one or other basic tint.

Since the method of the invention in its simplest version proposes only a single tint formula, it is perfectly well adapted to users not having staff highly qualified in painting.

It is more particularly suitable to small industries producing or using tinted paints.

The present invention finds its application in particular in the use of so called automixing apparatus which, after introducing a composition formula, allow a given amount of mixture to be manufactured. These apparatus have been used for about 20 years by car body and building paint distributors, as well as by a few industries. The use of such apparatus has two drawbacks which however do not adversely affect the widespread use thereof.

(a) the automixer can only be supplied with basic tints of a constant quality distributed by the same supplier, (b) the automixer can only be used with formulae communicated by the basic tint manufacturer who must further permanently update his collection of formulae.

These drawbacks lead to the following consequences:

(1) The automixer is related to one paint manufacturer. It is not rare for a distributor to have several automixers so as to be able to obtain several qualities of paint from different manufacturers.

(2) The constant quality required by the automixer results in production constraint for the paint manufacturer, which results in a high manufacturing cost.

(3) The permanent updating of the collection of formulae means that the fabricant must have a colorimetry laboratory and a commercial infrastructure adapted to this constraint.

All these consequences mean that the cost of a paint tinted by an automixer is close to twice the price of an identical quality formulated by a conventional method from mass produced products. Only the remarkable flexibility of production and the extremely short execution times which results therefrom have allowed the widespread use of automixers for obtaining tints in small quantities.

The method of the invention overcomes the two above mentioned drawbacks.

In fact, it allows the automixer to be adapted to the use of basic tints of any quality, so coming from different supplies, and it does away with the need of a preestablished collection of formulae.

In addition, the tints thus manufactured, apart from amortizement of the equipment required for implementing the method of the invention, are obtained from bases costing only half as much as the bases related to the automixer.

The invention also extends its scope to the apparatus for implementing the new method, which apparatus may comprise:

a tristimulus control colorimeter adapted for measuring the trichromatic coordinates of a sample to be countertyped; and, a processor with input/output means for accepting colorimetric measurement data from the tristimulus control colorimeter and for accepting data regarding calculating the curve of the illuminant under which the colorimeter works, values K and S of basic tints, and values $\bar{x}(\lambda)$, $\bar{y}(\lambda)$, and $\bar{z}(\lambda)$, of a standardized (e.g., C.I.E.), composition of a paint whose three characteristic values, functions of trichromatic components X, Y and Z are equal to those of the tints to be countertyped, within admitted tolerances. The apparatus may further comprise an automixer under the control of the processor. The colorimeter according to the invention may be, for example, a Minolta CHROMA-METER CR-200b. Computations may be carried out by any microcomputer, for example any microcomputer (e.g., IBM, Olivetti, Apple, etc.), programmed to effect the calculations stated hereinabove. The calculations can be suitably accurate using a 16 bit digital word, however, it is also possible to employ more bits, floating point computations or the like, for obtaining a desired accuracy.

It is not strictly necessary that the processor be directly and operatively connected t the colorimeter by means of an interface. It is also possible, and in fact preferably, that the user measure the colorimetric values of the standard, whereupon the user can read the output from the colorimeter and input the necessary data, or cause the data to be input, at a keyboard or other input device to the microcomputer. Alternatively, an autonomous version of the machine can be made by providing a automatic interface between the colorimeter and microcomputer and/or between the microcomputer and an automatic tinting machine, or "automixer". The tinting machine (auto-mixer) in practice produces the particular tint mixture which is computed by the computer, and according to the autonomous version can be directly controlled by the computer instead of being controlled manually.

Figure 5:
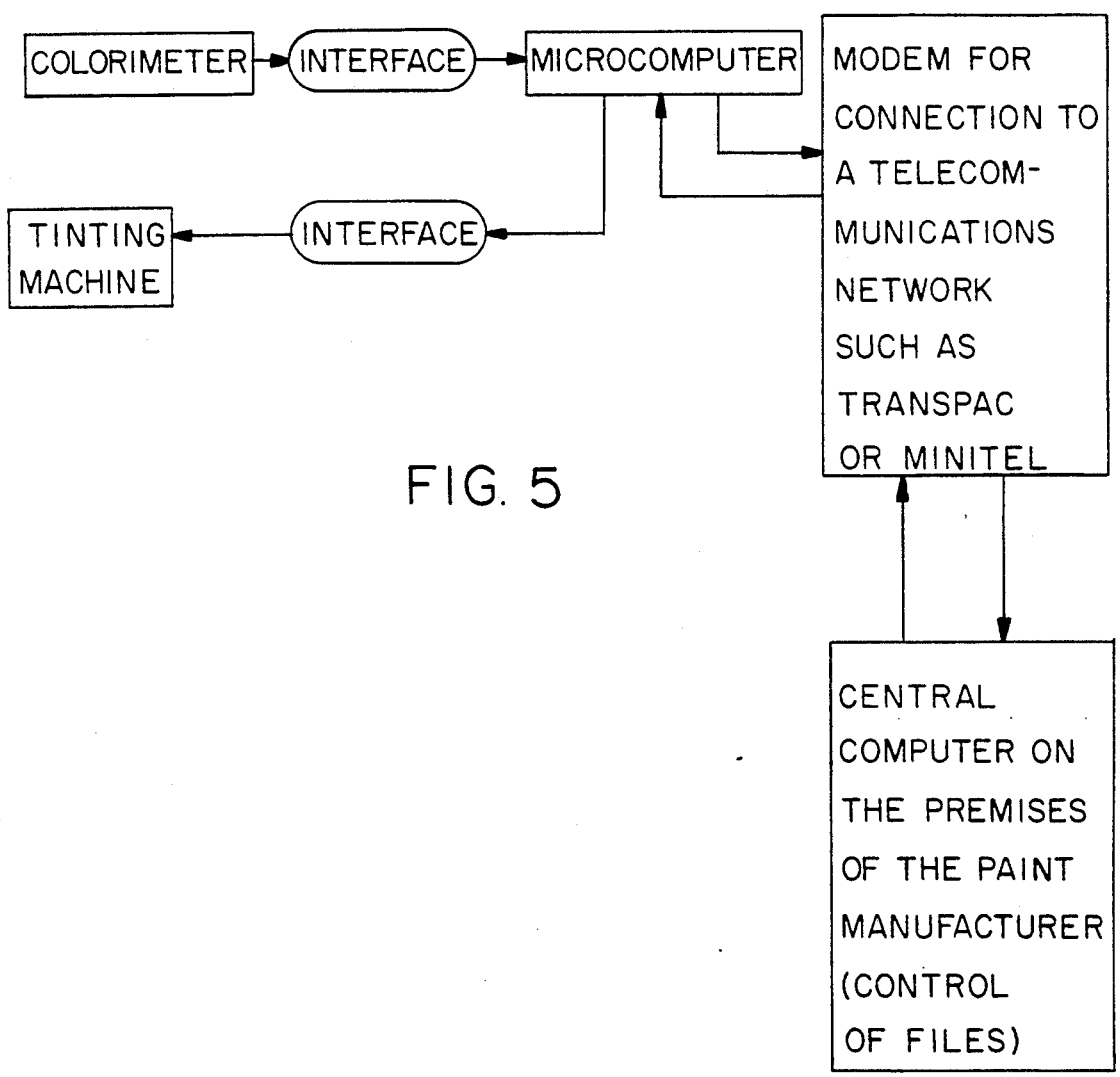

As a further embodiment of the apparatus of the invention, a less complex processor, or a processor which simply manages input/output functions, can be employed together with a modem, connected to a telecommunications network such as the telephone system, being programmed to communicate with a more-powerful central computer, the central computer effecting calculations in accordance with the aforesaid process. The central computer can be located on the premises of a paint manufacturer, which of course has control of the information respecting the characteristics of basic tints to be mixed, C.I.E. standardized definitions and accordingly efficiently produces the necessary data input for normalizing the output of the colorimeter, and enabling calculations to be effected in the trichromatic space of the colorimeter. FIG. 4 illustrates an embodiment of the invention wherein the processor is a programmed microcomputer directly associated or in data communication with the colorimeter. FIG. 5 illustrates the apparatus of the invention wherein the calculations are effected at a centralized processor communicating with the local area by means of a modem or the like.

It should of course be understood that, when it is stated herein that the colorimeter is adapted for measuring the trichromatic coordinates, the colorimeter gives three values which reflect X, Y and Z and that it is these three values which are used. As was seen above, the three characteristic values of the basic tints and of the tint to be countertyped may be the dominant wave length $\lambda d$, the luminance y and the purity Pu.

Since colorimeters have their "personal equations", due to the inherent variability of components aforesaid and setups from one embodiment of a colorimeter design to another or from one model to another, the correction as noted is programmed into the processor for taking this into account.

In another embodiment of the invention, the basic tints are pigmentary concentrates capable of giving paints of different qualities (acrylic, glycerophthalics, etc . . . ) by mixing with appropriate binders or varnish.

It will be noted that, in the implementation of the present invention, batches of paint which are unsold or whose tint is a failure may be recovered by using them as basic tint, whose spectral reemission curve then the values K and S will be determined. These values will be entered in the second file and the unsold paint may thus be used without waste.

The invention is described hereafter with reference to the graphic representation of a color diagram or domain, for additional details. FIG. 1 of the accompanying drawings refer to a chromatic diagram or domain for detecting a color by its trichromatic coordinates. If W is the neutral point and if the tint to be countertyped corresponds to point T, the dominant wave length of the tint corresponds to the intersection $\lambda$ d of the straight line WT with the spectral locus. The purity Pu of the tint to be countertyped corresponds to the ratio of lengths $$\frac{WT}{W\lambda d}.$$

The luminance Y of the tint to be countertyped is obtained directly from colorimetric measurements of the sample.

If the basic tints whose dominant wave length $\lambda d_1$ and $\lambda d_2$ enclosing $\lambda d$ are $T_1$ and $T_2$, calculation by successive approximations will depart from a fictitious mixture in which the tints $T_1$ and $T_2$ will be in a proportion corresponding, for example, to the distance ratio:

$$\frac{\lambda d_1 \; \lambda d}{\lambda d_2 \; \lambda d}$$

For the first approximation, the following tolerances will be fixed for example:

$$\Delta E (\lambda d) \pm 5 \text{ nm} \quad \Delta E (Y) \pm 5 \quad \Delta E (Pu) \pm 0.05$$

For the second approximation, these tolerances will be reduced by half; for the third approximation, they will again be reduced by half, etc . . .

Generally, $\Delta E$ is fixed at 0.5 or 1. However, for industries not requiring as nearly perfect a countertyping accuracy, $\Delta E$ may be fixed at a higher value.

It will be noted that if it appears that the mixture of basic tints initially selected is not suitable because its purity is less than that of the tint to be countertyped, it is possible to modify the fixed $\Delta E$ if the final destination of the paint allows it.

The method and apparatus of the invention offer the advantages, as was mentioned above, of requiring much less costly equipment than that at present available to countertype tints and of being able to be used by non qualified staff. The tint of the composition which it proposes is fairly precise for it uses two basic tints closely related to one another. Generally, the formula found is not very far removed from that the manufacturer of the tint to be countertyped for the apparatus works in accordance with the same laws as those applied by the colorist.

The drawback of the method is of course, that in its simplest version, i.e. using a colorimeter which only works under an illuminant and only at one angle, and only having recourse to four basic tints including white and black, the device can supply only a formula which takes into account neither the varying response to illuminants of different colors, nor the specular brilliance or directional mirror-like shininess of the tints as may result, for example, by adding reflective flakes. Nor does the method concern itself with the cost of the formula proposed as a result of variations in the cost of component tints in simple form.

These drawbacks may however be remedied by using more sophisticated versions of the method and of the apparatus. Thus, in so far as the variations with illuminants of different colors is concerned, this may be taken into consideration by using a colorimeter operating under different illuminants. As far as the specular brilliance is concerned, either basic tints having the same brilliance as the sample to be countertyped, or a colorimeter for making measurements at different angles may be employed. In so far as the cost price is concerned, a calculation of the cost price may be made as soon as the basic tints $T_1$ and $T_2$ are selected, and if this cost price is excessive, the processor may be used to search for a less expensive mixture either from two basic tints $T_1$ and $T_3$, or from three basic tints $T_1$, $T_2$ and $T_3$. Alternatively, the operator may be presented with choices from various alternative component combinations.

Of course the invention is non limited to the embodiment described by way of example. Thus, instead of being formed by the values $\bar{x}(\lambda)$, $\bar{y}(\lambda)$ and $\bar{z}(\lambda)$ of the C.I.E., the first file could just as well be formed by the values Y, x and y also supplied by the C.I.E. Instead of using the values Y, x and y recourse could just as well be had to their conventional equivalents such as L*, a* and b*, these variables being defined through the C.I.E. Furthermore, although the method generally uses the Kubelda Munk law mentioned above (II) in its version with two relative constants, it may also apply the one constant version, for example in the case of textile fiber dyeing, or the version with two absolute constants, which allows the pigmentary charge to be determined for obtaining a given opacity or a semitransparent layer to be formulated, by taking into account the color of the support on which the paint will be applied. The method could further use any other law such as the Beer-Lambert law for calculating the components of a mixture observed by transparency.

I claim:

1. A method for counterplying an original tint by formulation of a composition made from a collection of basic tints, without measuring a reflectance curve of the original tint to be countertyped, comprising:

forming a first file including values of spectral trichromatic components $x(\lambda)$, $y(\lambda)$, and $z(\lambda)$ supplied by the C.I.E. and including a characteristic response curve of a colorimeter which will be used for measuring the sample to be countertyped, forming a second file of K and S values of the basic tints, calculating, from these two files and thereby subject to said characteristic response curve, values of three characteristics, functions of the trichromatic components X, Y and Z, for each basic tint, measuring, by colorimetry, the trichromatic components X, Y and Z of the sample to be countertyped, from which the trichromatic coordinates x, y and z of the tint of this sample are obtained, determining, from the first file and from the values obtained by the colorimetric measurement, the same three characteristic values for the tint to be countertyped, and by successive approximations, determining a mixture of at least four basic tints, including white and black, which have the same three characteristic values equal to those of the tine to be countertyped, within admitted tolerances, and mixing said at least four basic tints in proportions determined, whereby a mixture is created will match the original tint sample.

2. The method according to claim 1, wherein the first file of the values of the spectral trichromatic components covers the visible spectrum in steps of 1 nm.

3. The method according to claim 1, wherein the second file covers the visible spectrum in steps of 20 nm.

4. The method according to any one of claim 1, 2 or 3, wherein the three characteristics, functions of X, Y and Z of basic tints and of the tint to be countertyped, are dominant wave length $\lambda d_1$, $\lambda d_2$, ... $\lambda d_n$, luminance $Y_1$, $Y_2$, ... $Y_n$ and purity $Pu_1$, $Pu_2$, ... $Pu_n$.

5. The method according to claim 4, wherein the determination of the mixture of successive approximations is obtained by successive approximations, in this order, of the dominant wave length, of the luminance and of the purity.

6. The method according to claim 4, wherein the approximation of the dominant wave length is made by selecting at least two basic tints whose dominant wave lenghts $\lambda d_1$ and $\lambda d_2$ enclose the dominant wave length $\lambda d$ of the tint to be countertyped and by determining a mixture ratio between these tints, such that the dominant wave length $\lambda m$ of the mixture is satisfied.

7. The method according to claim 6, wherein the approximation of the luminance is made by adding white or black to the mixture obtained in the preceding step, until a satisfactory luminance $Y_m$ is obtained.

8. The method according to claim 7, wherein the approximation of the purity is made by:

determination of a grey with luminance equal to that of the tint to be countertyped; and then adding said grey to that mixture from the preceding step until a satisfactory purity $Pu_m$ is obtained.

9. The method according to claim 5, wherein between each approximation, a spectral reemission curve of the mixture obtained and the value of the characteristic function of X, Y or Z object of the approximation are calculated, after which the value obtained is compared with the desired value for determining if the difference comes within the initially fixed limits of tolerance.

10. The method according to claim 5, wherein when the first approximation of the three characteristics $\lambda d$, Y and Pu is finished, the spectral reemision curve of the mixture obtained and the value of the three characteristics, objects of the approximation, are calculated, and then determining whether the $\Delta P$ such as defined by the C.I.E. comes within the initially fixed tolerance limit.

11. Apparatus for implementing the countertyping of a tint sample without measuring its reflectance comprising:

a tristimulus control colorimeter adapted for measuring trichromatic coordinates of the sample to be countertyped and, a processor to calculate colorimetric values from colorimeter measurements including:

a characteristic response curve of the colorimeter, values K and S of at least two basic tints, and values $X(\lambda)$ and $z(\lambda)$ of the C.I.E., and a dispensing means for dispensing said at least two basic tints in the proportions calculated, whereby a paint in which the values of three characteristic functions of trichromatic components X, Y and Z are calculated subject to said characteristic response curve to be equal to those of the tint to be countertyped within admitted tolerances is created by dispensing the tints in said calculated proportions.

12. The apparatus according to claim 11, wherein the three characteristic functions of X, Y and Z are the dominant wave length $\lambda d$, the luminance Y and purity Pu.

* * * * *

UNITED STATES PATENT AND TRADEMARK OFFICE
CERTIFICATE OF CORRECTION

PATENT NO. : 5,023,814
DATED : June 11, 1991
INVENTOR(S) : JEAN-PIERRE H.B. GUILLEMIN It is certified that error appears in the above-identified patent and that said Letters Patent is hereby corrected as shown below:

On the title page item [30] should be inserted after item [21]:

```
    [30]              Foreign Application Priority Data
         Feb. 15, 1985   [FR] France............8502184
         Feb. 13, 1986   [PCT] PCT.........PCT/FR86/00043
                                                  --.
```

Signed and Sealed this

Twenty-first Day of December, 1993

Attest:

BRUCE LEHMAN

Attesting Officer   Commissioner of Patents and Trademarks